United States Patent
Guillot et al.

(10) Patent No.: US 10,581,317 B2
(45) Date of Patent: Mar. 3, 2020

(54) PULSE WIDTH MODULATION-STABILIZED ELECTRIC POWER SUPPLY

(71) Applicant: VALEO VISION, Bobigny (FR)

(72) Inventors: Bernard Guillot, Bobigny (FR); Irantzu Jauregi, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/009,677

(22) Filed: Jun. 15, 2018

(65) Prior Publication Data

US 2018/0367028 A1     Dec. 20, 2018

(30) Foreign Application Priority Data

Jun. 15, 2017 (FR) .................... 17 55443

(51) Int. Cl.
*H05B 33/08* (2006.01)
*H02M 1/32* (2007.01)
*H02H 7/12* (2006.01)

(52) U.S. Cl.
CPC ............ *H02M 1/32* (2013.01); *H02H 7/1213* (2013.01); *H05B 33/0887* (2013.01)

(58) Field of Classification Search
CPC ............ H05B 33/0815; H05B 33/0845; H05B 33/083; H05B 33/089; H05B 37/0227; H05B 37/0272; H05B 33/0809; H05B 33/0827; H05B 37/0218; H05B 33/0851; H05B 37/02; H05B 37/0263; H05B 33/0818; H05B 33/0857; H05B 41/14
See application file for complete search history.

(56) References Cited

U.S. PATENT DOCUMENTS

| | | | |
|---|---|---|---|
| 5,574,632 A * | 11/1996 | Pansier | H02H 9/001 323/901 |
| 5,943,225 A | 8/1999 | Park | |
| 6,081,433 A * | 6/2000 | Nishida | H02M 3/335 363/19 |
| 6,320,357 B1 * | 11/2001 | Peters | H02H 9/001 323/222 |
| 2004/0145930 A1 | 7/2004 | Noro | |
| 2011/0164339 A1 | 7/2011 | Schmid et al. | |

(Continued)

FOREIGN PATENT DOCUMENTS

DE     26 20 191 A1     11/1977

OTHER PUBLICATIONS

French Preliminary Search Report dated Jun. 4, 2018 in Patent Application No. 1755443 (with English language translation of category of cited documents).

*Primary Examiner* — Wei (Victor) Y Chan
(74) *Attorney, Agent, or Firm* — Oblon, McClelland, Maier & Neustadt, L.L.P.

(57) ABSTRACT

A device for supplying electric power to an electronic component, including a DC-to-DC converter able to operate using pulse width modulation with high states and low states, with an input and an output, the output being intended to supply power to the electrical component; and a protective circuit connected to the input of the DC-to-DC converter, with a storage capacitive component connected to a diode for protecting against polarity reversals. The protective circuit furthermore includes a bypass for bypassing the protective diode so as to allow the storage capacitive component to discharge during the low states of the pulse width modulation.

13 Claims, 2 Drawing Sheets

(56) References Cited

U.S. PATENT DOCUMENTS

| | | | |
|---|---|---|---|
| 2012/0200230 A1* | 8/2012 | Esaki | H05B 33/0851 |
| | | | 315/200 R |
| 2017/0013694 A1* | 1/2017 | Nakamura | H05B 33/0887 |
| 2018/0105099 A1* | 4/2018 | Weber | B60Q 1/2696 |

* cited by examiner

PULSE WIDTH MODULATION-STABILIZED ELECTRIC POWER SUPPLY

The invention relates to the field of the supply of electric power to components such as semiconductor light sources, in particular on motor vehicles.

The use of light-emitting diode (LED) light sources is becoming increasingly common, in particular for lighting and light signalling on motor vehicles. LEDs, like all electronic components, have maximum operating temperature limits, which partly determines their lifetime. An LED behaves electrically like a diode, meaning that, in order to emit, it has to be forward-biased. The forward voltage is the voltage across its terminals when it is flowed through by a current and when it emits light. This voltage increases with the current, and is normally between 1.5 and 4 volts. It is also temperature-dependent. Like any electrical and electronic component, an LED has a maximum admissible current. The current flowing through the LED not only determines the luminous intensity that is emitted, but also has an impact on its lifetime, its efficiency and the colour it emits. Specifically, an LED flowed through by an excessively high current will have its lifetime and its efficiency reduced over time and will have the colour it emits changed. For all of these reasons, it is appropriate to supply power to an LED via a current regulation device. In some cases, in particular when it is necessary to comply with a precise chromaticity but when it is necessary to greatly lower the luminous intensity, it is common to control the current regulation device using pulse width modulation (more commonly denoted using the acronym PWM) while at the same time keeping a constant current magnitude during the high states. The human eye will have the impression that the intensity has lowered, but that the colour is constant. Now, if the current were to be lowered in the same way, but constantly, the human eye would see the same desired variation in luminous intensity, but would also see an (unwanted) colour change.

It is moreover common to use a DC-to-DC converter, such as a buck, boost, SEPIC or flyback converter, forming a switch-mode power supply that converts a DC voltage into another DC voltage of lower value or of higher value.

In the case of applications to motor vehicles, such a converter is supplied by the on-board voltage of the vehicle, namely of the order of 12 volts. Now, the on-board voltage of a vehicle may be subject to very brief overvoltages of the order of 100 to 250 volts. Such brief overvoltages have the effect of charging a capacitor connected across the input terminals of the DC-to-DC converter and thus of creating supply overvoltages that are liable to disturb the correct operation of said converter.

The aim of the invention is to mitigate at least one of the problems of the abovementioned prior art. More particularly, the aim of the invention is to mitigate the problems of disturbances created by brief overvoltages at the input of a DC-to-DC converter that is alternately activated and deactivated and that supplies power to an electronic component, such as one or more LED light sources.

One subject of the invention is a device for supplying electric power to an electronic component, comprising a DC-to-DC converter able to operate using pulse width modulation with high states and low states, with an input and an output, said output being intended to supply power to the electrical component; a protective circuit connected to the input of the DC-to-DC converter, with a storage capacitive component connected to a diode for protecting against polarity reversals; noteworthy in that the protective circuit furthermore comprises a means for bypassing the protective diode so as to allow the storage capacitive component to discharge during the low states of the pulse width modulation.

For the connection between the protective circuit and the input of the DC-to-DC converter, this is understood to be a direct connection, that is to say terminal to terminal, as well as an indirect connection, for example with components.

According to one advantageous mode of the invention, the bypass means is connected in parallel with the protective diode.

According to one advantageous mode of the invention, the bypass means is configured to be active only when the voltage at the storage capacitive component is greater than the input voltage of the device.

According to one advantageous mode of the invention, the bypass means is configured such that the discharge current of the storage capacitive component when bypassing the protective diode is dependent on the difference between the voltage at the storage capacitive component and the input voltage of the device.

According to one advantageous mode of the invention, the bypass means comprises a PNP bipolar transistor with an emitter connected to the anode of the protective diode and a collector connected to the cathode of said diode.

According to one advantageous mode of the invention, the bypass means comprises a resistor connected between the collector of the transistor and the anode of the protective diode and/or a resistor connected between the emitter of the PNP bipolar transistor and the cathode of the protective diode.

According to one advantageous mode of the invention, the resistor has a value of greater than 1 ohm and/or less than 100 ohms.

According to one advantageous mode of the invention, the PNP bipolar transistor comprises a base connected to ground.

According to one advantageous mode of the invention, the bypass means comprises a resistor connected between the base of the transistor and ground.

According to one advantageous mode of the invention, the resistor has a value of greater than 100 ohms and/or less than 47 000 ohms.

According to one advantageous mode of the invention, the bypass means comprises a diode and a resistor connected in series, said diode being oriented the opposite way from the protective diode.

According to one advantageous mode of the invention, the resistor has a value of greater than 1000 ohms and/or less than 20 000 ohms.

According to one advantageous mode of the invention, the diode of the bypass means is a unipolar diode.

According to one advantageous mode of the invention, the diode of the bypass means is an NPN bipolar transistor with a base in the collector.

Another subject of the invention is a lighting device, in particular for a motor vehicle, comprising at least one semiconductor light source, in particular of light-emitting diode type; a device for supplying electric power to the light source(s); noteworthy in that the electric power supply device is in accordance with the invention.

The provisions of the invention are beneficial in that they make it possible to avoid the problems of variation in the supply of power to the component in the event of overvoltages with regard to the input voltage of the power supply device. Such overvoltages are common in particular in on-board networks of motor vehicles. These overvoltages may reach values of 100 to 250 volts. However, they are very brief. The provisions of the invention are all the more useful the lower the duty cycle of the PWM signal that activates and deactivates the converter, as it is precisely during the low-state periods of the converter, that is to say when it is deactivated and therefore is not consuming current, that the supply overvoltages are liable to disturb the correct operation of the converter in the activation that follows the overvoltage in question, which overvoltage has arisen during a period of deactivation of the converter.

Other features and advantages of the present invention will be better understood with the aid of the description and the drawings, in which:

FIGS. 1 and 2 illustrate a known electric power supply device and the consequence of a brief overvoltage on the supply current.

Figure 1:
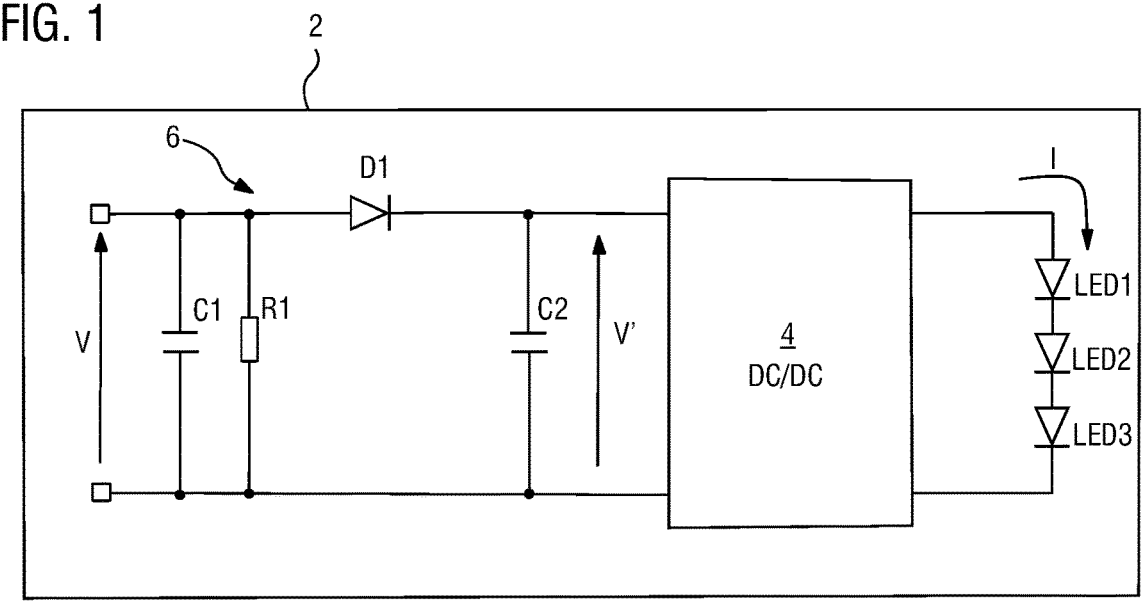
FIG. 1 illustrates an electric power supply device according to the prior art.
Figure 2:
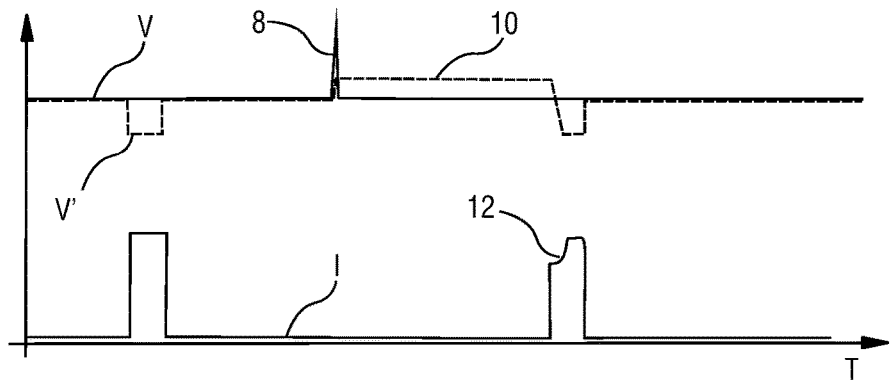
FIG. 2 illustrates the voltages V and V' and the current I of the power supply device of FIG. 1 in the presence of an overvoltage.

The electric power supply device 2 essentially comprises a DC-to-DC converter and a circuit 6 for protecting the converter.

The DC-to-DC converter 4 may be a buck, boost, SEPIC or flyback converter, etc., that is to say a switch-mode power supply that converts a DC voltage into another DC voltage of lower value or of higher value. It essentially comprises an inductor (single, dual, transformer, etc.), a switch and a diode. When the switch is closed, the current generated by the input voltage flows through the inductor and increases linearly. With the voltage across the terminals of the diode being negative, no current flows through said diode. When the switch is open, the diode changes to the on state so as to ensure continuity of the current in the inductor, and the current flowing through the inductor decreases. Such converters are well known per se to those skilled in the art.

The protective circuit 6 comprises a capacitor C1 and a resistor R1 connected in parallel that make it possible to filter fluctuations in input voltages V. Said circuit comprises a protective diode D1 protecting the converter 4 against reversal of the supply voltage. It also comprises a capacitor C2 intended to form an electrical energy store to compensate for possible micro-outages.

When the supply voltage V is constant, the voltage V' across the input terminals of the DC-to-DC converter 4, minus the threshold voltage of the diode D1, is likewise constant. Upon an overvoltage 8 of high value but short duration to the supply voltage V while the converter 4 is deactivated through a low state of the pulse width modulation and is therefore not delivering any current to the components LED1, LED2 and LED3, the capacitor C2 will charge and the voltage V' will exhibit a jump 10. This jump remains constant for as long as there is no consumption at the converter 4. As soon as the latter becomes active, that is to say draws a current I into the components LED1, LED2 and LED3, it will see an input voltage higher than the nominal voltage and will consequently react to adjust the output current. Now, the input voltage V' will return very quickly to the nominal level, such that the output current I will exhibit an increase with a small lower intermediate increment 12, resulting in flickering in the luminous intensity of the LEDs.

Figure 3:
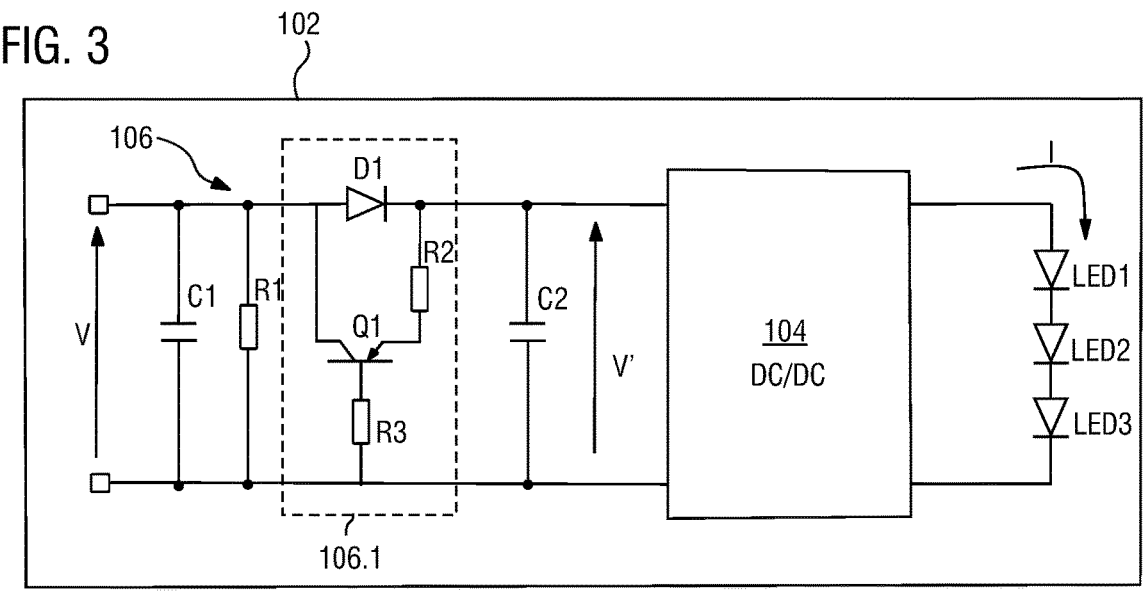
FIG. 3 illustrates an electric power supply device according to a first embodiment of the invention.

FIG. 3 illustrates an electric power supply device according to a first embodiment of the invention.

The power supply device 102 is similar to that of FIG. 1, with the difference that the protective circuit 106 comprises a means 106.1 for bypassing the diode D1 for the purpose of discharging the capacitor C2 in the absence of consumption by the converter 104. Reference is moreover made to the description of the power supply device of FIG. 1 for identical or similar elements.

The bypass means 106.1 comprises a bipolar transistor Q1 of PNP type, whose emitter is connected to the anode of the diode D1 and whose collector is connected to the cathode of the diode D1, advantageously via a resistor R2. The resistor R2 has a low value, for example of greater than 1 ohm and/or less than 100 ohms. This value range is intended to promote the flow of the current. In the case where it would be necessary to limit this current for a particular reason, it suffices to very easily increase the value of this resistor in order to lower the value of the current. The base of the transistor Q1, for its part, is connected to the low potential of the supply voltage V, in this case to ground, advantageously via the resistor R3. It may have a value of greater than 1000 ohms and/or less than 47 000 ohms. Its value may be selected depending on the desired value of the impedance between the anode or the cathode of the diode and ground, while at the same time allowing the transistor to be in the on state.

In the absence of an overvoltage to the supply voltage V, the voltage V' across the input terminals of the DC-to-DC converter 104, minus the threshold voltage of the diode D1 when the DC-to-DC converter 104 is active and when a supply current is flowing, is constant. The base current of the transistor Q1 is low, essentially due to the high value of the resistor R3. In this case, the collector and the emitter of the transistor Q1 are biased, and a current for bypassing the diode D1 is able to flow. Such a current does not flow, however, given that V'≤V.

In the presence of a brief overvoltage to the supply voltage V while the converter 104 is not drawing current, the capacitor C2 will charge and the voltage V' will increase to the point of becoming greater than the voltage V which, following the brief overvoltage, has returned to a 'stable' value (for example, the nominal value). The increased voltage V' will then cause an increase in the base current of the transistor Q1, and thus increase the corresponding collector current to a current for bypassing the diode D1, which will discharge the capacitor C2.

The protection against a supply voltage reversal, which is ensured by the diode D1, remains active as the bypass device is deactivated if there is a polarity reversal on account of the fact that the base-emitter junction of the transistor Q1 is then reverse-biased and therefore in the off state. The means for bypassing the diode D1, due to the presence of the transistor Q1, exhibits potentially non-linear behaviour that reacts specifically to situations in which the voltage V' is substantially greater than the nominal voltage. The discharge time of the capacitor C2 may then be very short.

The discharging of the capacitor C2, which has just been described, thus makes it possible to prevent the phenomenon of flickering with regard to the luminous intensity of the LEDs. Specifically, the rapid discharging of the capacitor C2, followed by a brief overvoltage in the supply voltage while the converter 104 is not drawing current (that is to say that the pulse width modulation is in the low state), prevents the voltage V' across the input terminals of the converter 104 from rising at the moment when the latter becomes active again, and thus prevents transient phenomena of adjusting the converter to a rapid variation in the input voltage of the converter.

Figure 4:
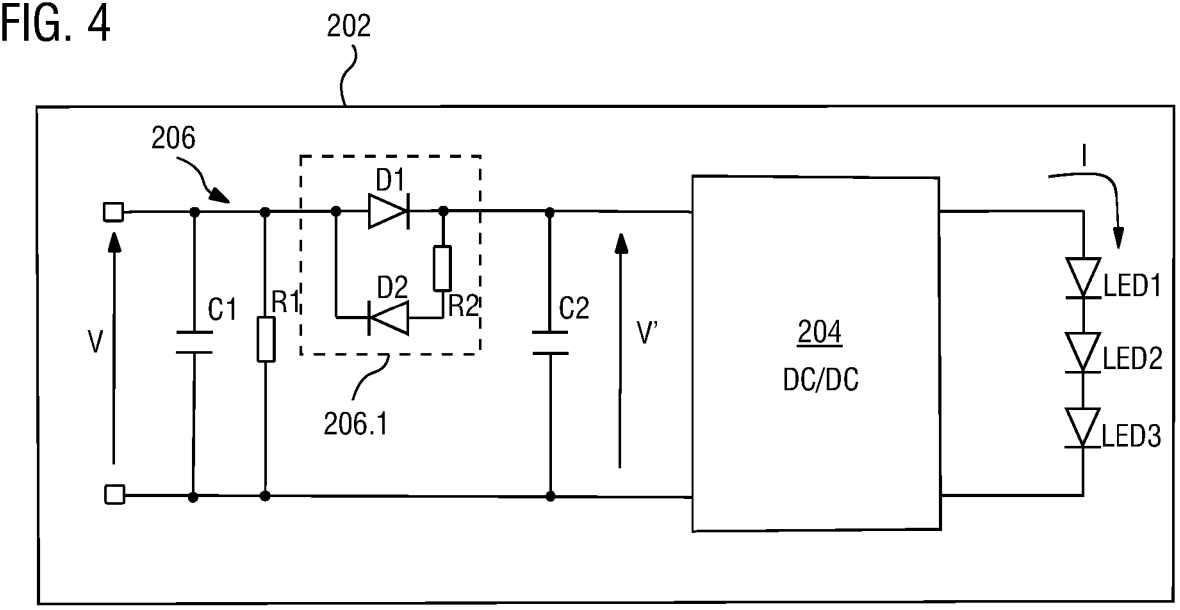
FIG. 4 illustrates an electric power supply device according to a second embodiment of the invention.

FIG. 4 illustrates an electric power supply device according to a second embodiment of the invention. The reference numbers of FIG. 3 are used to denote identical or similar elements, these numbers however being increased by 100. Reference is moreover made to the description of these elements with reference to FIG. 3 and FIG. 1.

The power supply device 202 is similar to that of FIG. 3, with the difference that the means 206.1 for bypassing the diode D1, at the protection circuit 206, is different. Specifically, the bypass means comprises a diode D2 connected across the terminals of the protective diode D1 and in the reverse direction. In other words, the anode of the diode D2 is connected to the cathode of the diode D1, and the cathode of the diode D2 is connected to the anode of the diode D1. More specifically, a resistor R2 is connected in series with the diode D2 in order to limit the current for bypassing the diode D1 in the event of reversal of the supply voltage. This resistor R2 advantageously has a value of greater than 1000 ohms and/or less than 20 000 ohms.

In the presence of a brief overvoltage to the supply voltage V while the converter 204 is not drawing current, the capacitor C2 will charge and the voltage V' will increase to the point of becoming greater than the voltage V which, following the brief overvoltage, has returned to a 'stable' value (for example, the nominal value). The capacitor will then be able to discharge via a current for bypassing the diode D1, via the forward-biased diode D2, the diode D1 then being reverse-biased. The discharge current is naturally limited by the resistor R2. The latter may then be dimensioned so as to ensure sufficiently rapid discharging of the capacitor C2 to avoid unstable operation of the converter 204 when it becomes active again, on the one hand, and to protect the converter 204 against a reverse current that would result from reversal of the supply voltage, on the other hand.

Figure 5:
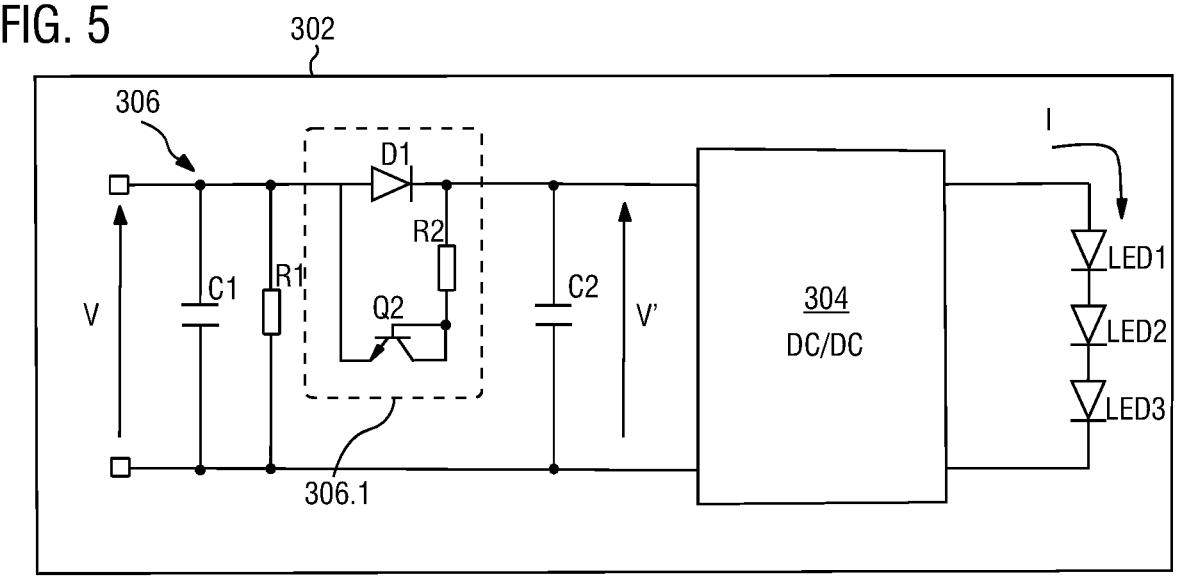
FIG. 5 illustrates an electric power supply device according to a third embodiment of the invention.

FIG. 5 illustrates an electric power supply device according to a third embodiment of the invention. The reference numbers of FIG. 3 are used to denote identical or similar elements, these numbers however being increased by 200. Reference is moreover made to the description of these elements with reference to FIGS. 4, 3 and 1.

The power supply device 302 is similar to that of FIG. 4, with the difference that the means 306.1 for bypassing the diode D1, at the protective circuit 206, is somewhat different in that the diode D2 is replaced with a bipolar transistor Q2 of NPN type biased by collector reaction. In other words, the base is connected directly to the emitter of the transistor Q2, which is equivalent to saying that the transistor Q2 behaves like a diode. More precisely, the collector of the transistor Q2 is connected to the cathode of the diode D1 and the emitter of said transistor is connected to the anode of said diode. Similarly to the embodiment of FIG. 4, a resistor R2 is connected in series with the transistor Q2 in order to limit a reverse current that would result from reversal of the supply voltage. This resistor R2 advantageously has a value of greater than 1000 ohms and/or less than 20 000 ohms.

Figure 6:
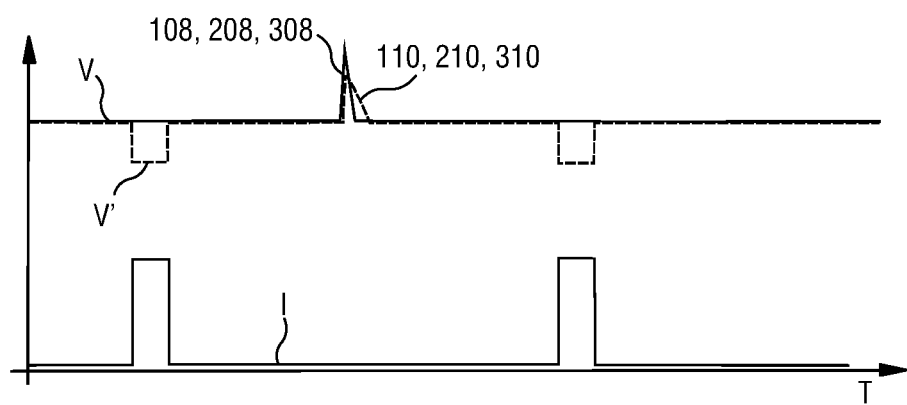
FIG. 6 illustrates the voltages V and V' and the current I of the power supply devices of FIGS. 3 and 5 in the presence of an overvoltage.

FIG. 6 illustrates the evolution of the voltages V and V' and of the current I in one of the power supply devices of the embodiments of FIGS. 3 to 5.

It may be seen that the voltage V' at the input of the DC-to-DC converter is slightly lower than the supply voltage V when a supply current is flowing, due to the threshold voltage of the protective diode D1. It may also be seen that the supply voltage V exhibits a brief overvoltage 108, 208 or 308. This overvoltage causes charging of the capacitor C2 and an overvoltage 110, 210 or 310 with regard to the voltage V'. This overvoltage is brief as the means 106.1, 206.1 or 306.1 for bypassing the protective diode D1 allows the capacitor C2 to discharge. This discharging may be performed in the power supply network, which in principle has a limited impedance. Still in FIG. 6, it may then be seen that the second current pulse, after the overvoltage, is not disturbed as the voltage V' has been re-established at a 'stable' value (for example at the nominal value) before said pulse.

Generally, the means for bypassing the protective diode, according to the invention, is configured to be active only when the voltage at the storage capacitive component is greater than the input voltage of the device. In this case, an impedance towards the input and seen from the storage capacitive component is advantageously as low as possible and, otherwise, is very easily adjustable depending on the various constraints. By contrast, the opposite impedance, that is to say towards the storage capacitive component and seen from the input, is advantageously as high as possible and is also easily adjustable depending on the various constraints.

The provisions of the invention that has just been described are particularly beneficial when the current pulses produced by the DC-to-DC converter correspond to a low level, such as for example 50% or less, that is to say when the output of the converter is in the low state for at least 50% of the time. In the case of FIG. 6, the high-state level is of the order of 10%. In other words, the low-state periods correspond to 90% of the time. This means that the low-state periods are longer than the high-state ones, and that the likelihood of causing flickering in the luminous intensity that is produced, following an overvoltage of the power supply network, is consequently higher.

The invention claimed is:

1. A device for supplying electric power to an electronic component, comprising:
   a DC-to-DC converter able to operate using pulse width modulation with high states and low states, with an input and an output, the output being intended to supply power to the electronic component;
   a protective circuit connected to the input of the DC-to-DC converter, with a storage capacitive component connected to a protective diode for protecting against polarity reversals;
   wherein the protective circuit furthermore comprises a means for bypassing the protective diode so as to allow the storage capacitive component to discharge, the bypass means includes a PNP bipolar transistor and a first resistor, the PNP bipolar transistor having an emitter connected to the cathode of the protective diode, a collector connected to the anode of the diode, and a base connected to a low potential of the input of the device, and the first resistor being connected between the base of the PNP bipolar transistor and the low potential of the input of the device.

2. The device according to claim 1, wherein the bypass means is connected in parallel with the protective diode.

3. The device according to claim 1, wherein the bypass means is configured to be active only when the voltage at the storage capacitive component is greater than the input voltage of the device.

4. The device according to claim 1, wherein the bypass means is configured to discharge current of the storage capacitive component when bypassing the protective diode is dependent on the voltage difference between the voltage at the storage capacitive component and the input voltage of the device.

5. The device according to claim 1, wherein the bypass means further comprises a second resistor connected between the collector of the PNP bipolar transistor and the anode of the protective diode.

6. The device according to claim 5, wherein the second resistor has a value of greater than 1 ohm and/or less than 100 ohms.

7. The device according to claim 1, wherein the first resistor has a value of greater than 1000 ohms and/or less than 47,000 ohms.

8. The device according to claim 1, wherein the bypass means comprises a diode and a resistor connected in series, said diode being oriented the opposite way from the protective diode.

9. The device according to claim 8, wherein the resistor has a value of greater than 1000 ohms and/or less than 20,000 ohms.

10. The device according to claim 8, wherein the diode of the bypass means is a unipolar diode.

11. The device according to claim 8, wherein the diode of the bypass means is an NPN bipolar transistor with a base in the collector.

12. Lighting device, for a motor vehicle, comprising: at least one semiconductor light source, of light-emitting diode type; a device for supplying electric power to the light source(s); wherein the device for supplying electric power is in accordance with claim 1.

13. The device according to claim 2, wherein the bypass means comprises a diode and a resistor connected in series, the diode being oriented the opposite way from the protective diode.

* * * * *